US008130639B1

(12) United States Patent
Robbins

(10) Patent No.: US 8,130,639 B1
(45) Date of Patent: Mar. 6, 2012

(54) METHOD AND SYSTEM FOR PROVIDING DISTINCTIVE ANNOUNCEMENTS IN A SIP-BASED NETWORK

(75) Inventor: David C Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 671 days.

(21) Appl. No.: 11/534,273

(22) Filed: Sep. 22, 2006

Related U.S. Application Data

(60) Provisional application No. 60/719,465, filed on Sep. 22, 2005.

(51) Int. Cl.
*G01R 31/08* (2006.01)

(52) U.S. Cl. ......... 370/229; 370/260; 370/392; 709/227

(58) Field of Classification Search .................. 370/229, 370/260, 328, 331, 352, 356, 389, 392, 401; 709/227
See application file for complete search history.

(56) References Cited

U.S. PATENT DOCUMENTS

| | | | |
|---|---|---|---|
| 3,737,587 | A | 6/1973 | Romero |
| 4,154,987 | A | 5/1979 | Rosenberg et al. |
| 4,528,424 | A | 7/1985 | Middleton et al. |
| 4,723,271 | A | 2/1988 | Grundtisch |
| 4,741,024 | A | 4/1988 | Del Monte et al. |
| 4,950,011 | A | 8/1990 | Borcea et al. |
| 5,165,095 | A | 11/1992 | Borcherding |
| 5,323,444 | A | 6/1994 | Ertz et al. |
| 5,471,519 | A | 11/1995 | Howe et al. |
| 5,619,561 | A | 4/1997 | Reese |
| 5,815,550 | A | 9/1998 | Miller |
| 5,835,570 | A | 11/1998 | Wattenbarger |
| 5,913,166 | A | 6/1999 | Buttitta et al. |
| 5,970,134 | A | 10/1999 | Highland et al. |
| 5,999,610 | A | 12/1999 | Lin et al. |
| 6,021,176 | A | 2/2000 | McKendry et al. |
| 6,026,156 | A | 2/2000 | Epler et al. |
| 6,031,896 | A | 2/2000 | Gardell et al. |
| 6,072,865 | A | 6/2000 | Haber et al. |
| 6,208,726 | B1 | 3/2001 | Bansal et al. |
| 6,219,414 | B1 | 4/2001 | Maciejewski et al. |
| 6,308,726 | B2 | 10/2001 | Sato et al. |
| 6,337,898 | B1 | 1/2002 | Gordon |
| 6,339,639 | B1 | 1/2002 | Henderson |
| 6,404,876 | B1 | 6/2002 | Smith et al. |
| 6,484,196 | B1 | 11/2002 | Maurille |
| 6,510,315 | B1 | 1/2003 | Arnson |
| 6,636,594 | B1 | 10/2003 | Oran |
| 6,735,295 | B1 | 5/2004 | Brennan et al. |
| 6,741,695 | B1 | 5/2004 | McConnell et al. |
| 6,744,877 | B1 | 6/2004 | Edwards |
| 6,754,325 | B1 | 6/2004 | Silver et al. |
| 6,801,604 | B2 | 10/2004 | Maes et al. |

(Continued)

OTHER PUBLICATIONS

Rosenbert et al. "RFC 3261, SIP: Session Initiation Protocol", Jun. 2002, pp. 1 & 164.*

(Continued)

*Primary Examiner* — Jung Park

(57) ABSTRACT

A system and method may include receiving a connection request including announcement information, the announcement information being associated with a distinctive announcement, and establishing a data session over a data network with a remote communication device based on the connection request. The system and method may further include mapping the announcement information to an alerting pattern, and generating an alerting signal for producing the alerting pattern.

21 Claims, 8 Drawing Sheets

U.S. PATENT DOCUMENTS 6,807,259 B1 10/2004 Patel et al.
6,834,048 B1 12/2004 Cho et al.
6,856,616 B1 2/2005 Schuster et al.
6,857,072 B1 2/2005 Schuster et al.
6,870,830 B1 3/2005 Schuster et al.
6,876,632 B1 4/2005 Takeda
6,879,673 B2 4/2005 Creamer et al.
6,954,521 B2 10/2005 Bull et al.
6,954,524 B2 10/2005 Gibson
6,961,332 B1 11/2005 Li et al.
6,963,633 B1 11/2005 Diede et al.
6,996,605 B2 2/2006 Low et al.
7,020,130 B2 3/2006 Krause et al.
7,031,700 B1 4/2006 Weaver et al.
7,082,193 B2 7/2006 Barclay et al.
7,085,253 B2 8/2006 Yang
7,130,282 B2 10/2006 Black
7,145,997 B2 12/2006 Poikselka et al.
7,203,293 B1 4/2007 Bedingfield
7,224,792 B2 5/2007 Fusco
7,257,837 B2 8/2007 Xu et al.
7,260,201 B2 8/2007 Jorasch et al.
7,274,662 B1 9/2007 Kalmanek et al.
7,283,517 B2 10/2007 Yan et al.
7,290,288 B2 10/2007 Gregg et al.
7,295,577 B2 11/2007 Moody et al.
7,301,913 B2 11/2007 Corrao et al.
7,406,696 B2 7/2008 Burger et al.
7,426,265 B2 9/2008 Chen et al.
7,440,440 B1 10/2008 Abichandani et al.
7,460,657 B1 12/2008 Baeza
7,489,771 B2 2/2009 McMurry et al.
7,580,497 B2 8/2009 Wang et al.
7,593,389 B2 9/2009 Vance
7,599,355 B2 10/2009 Sunstrum
7,609,700 B1 10/2009 Ying et al.
7,609,706 B2 10/2009 Scott et al.
7,630,481 B2 12/2009 Kafka
7,715,413 B2 5/2010 Vaziri et al.
7,743,141 B2 6/2010 Wang et al.
7,773,581 B2 8/2010 Punj et al.
7,860,089 B2 12/2010 Tripathi et al.
2002/0038388 A1 3/2002 Netter
2002/0114318 A1 8/2002 Rines
2002/0131447 A1 9/2002 Krishnamurthy et al.
2002/0136359 A1 9/2002 Stumer et al.
2002/0136363 A1 9/2002 Stumer et al.
2002/0141548 A1 10/2002 Boda
2003/0028806 A1 2/2003 Govindarajan et al.
2003/0043992 A1 * 3/2003 Wengrovitz .................. 379/229
2003/0088421 A1 5/2003 Maes et al.
2003/0231759 A1 12/2003 Bedingfield et al.
2004/0030750 A1 2/2004 Moore et al.
2004/0051900 A1 3/2004 Sagiya et al.
2004/0082324 A1 4/2004 Ayoub
2004/0090954 A1 5/2004 Zhang et al.
2004/0148395 A1 7/2004 Schulzrinne
2004/0207724 A1 10/2004 Crouch et al.
2004/0240656 A1 12/2004 Poustchi
2004/0249951 A1 12/2004 Grabelsky et al.
2004/0264406 A1 12/2004 Pattenden et al.
2005/0013421 A1 1/2005 Chavez et al.
2005/0043014 A1 2/2005 Hodge
2005/0069104 A1 3/2005 Hanson et al.
2005/0078642 A1 4/2005 Mayer et al.
2005/0123104 A1 6/2005 Bishop et al.
2005/0129219 A1 6/2005 Williamson
2005/0147227 A1 7/2005 Chervirala et al.
2005/0190721 A1 9/2005 Pershan
2005/0193338 A1 9/2005 Hawkins et al.
2005/0195802 A1 9/2005 Klein et al.
2005/0201530 A1 9/2005 Koch et al.
2005/0213716 A1 9/2005 Zhu et al.
2005/0215243 A1 9/2005 Black et al.
2005/0226217 A1 10/2005 Logemann et al.
2005/0237978 A1 10/2005 Segal
2005/0249196 A1 11/2005 Ansari et al.
2005/0286466 A1 12/2005 Tagg et al.
2006/0033809 A1 2/2006 Farley
2006/0039389 A1 2/2006 Burger et al.
2006/0062210 A1 3/2006 Dharanikota
2006/0062251 A1 3/2006 Lim et al.
2006/0067300 A1 3/2006 Poustchi et al.
2006/0067504 A1 3/2006 Goldman et al.
2006/0140379 A1 6/2006 Yamamoto et al.
2006/0140380 A1 6/2006 Croak et al.
2006/0146737 A1 7/2006 Ohrstrom Sandgren et al.
2006/0177030 A1 8/2006 Rajagopalan et al.
2006/0177044 A1 8/2006 O'Neil et al.
2006/0178130 A1 8/2006 Makrygiannis
2006/0203986 A1 9/2006 Gibson
2006/0218283 A1 9/2006 Jones et al.
2006/0221176 A1 10/2006 Di Pietro et al.
2006/0251229 A1 11/2006 Gorti et al.
2006/0285533 A1 * 12/2006 Divine et al. ................. 370/352
2006/0286984 A1 12/2006 Bonner
2007/0025270 A1 2/2007 Sylvain
2007/0058613 A1 * 3/2007 Beckemeyer ................. 370/352
2007/0083658 A1 * 4/2007 Hanna et al. .................. 709/227
2007/0092073 A1 4/2007 Olshansky et al.
2007/0111723 A1 5/2007 Ahmed et al.
2007/0143858 A1 6/2007 Hearty
2008/0049724 A1 2/2008 Tsujino et al.
2008/0126549 A1 5/2008 Khanchandani et al.

OTHER PUBLICATIONS

Schulzrinne et al., "RFC 2833—RTP Payload for DTMF Digits, Telephony Tones and Telephony Signals," The Internet Society, May 2000.
Mahy et al., "draft-ietf-sip-join-03—The Session Initiation Protocol (SIP)"Join"Header," The Internet Society, Feb. 2004.
Mahy et al., "draft-ieft-sipping-cc-framework-03—A Call Control and Multi-party usage framework for the Session Initiation Protocol (SIP)," The Internet Society, Oct. 27, 2003.
Rosenberg, "RFC 3311—The Session Initiation Protocol (SIP) Update Method," The Internet Soceity, Sep. 2002.
Rosenberg et al., "RFC 3262—Reliability of Provisional Responses in the Session Initiation Protocol (SIP)," The Internet Society, Jun. 2002.
Jennings et al., "RFC 3325—Private Extensions to the Session Initiation Protocol (SIP) for Asserted Identity within Trusted Networks," The Internet Society, Nov. 2002.
Harrington et al., "RFC 3411—An Architecture for Describing Simple Network Management Protocol (SNMP) Management Frameworks," The Internet Society, Dec. 2002.
Rosenberg et al., "RFC 3840—Indicating User Agent Capabilities in the Session Initiation Protocol (SIP),"The Internet Society, Aug. 2004.
Mahy, "RFC 3842—A Message Summary and Message Waiting Indication Event Package for the Session Initiation Protocol (SIP)," The Internet Society, Aug. 2004.
"SR-504: SPCS Capabilities and Features," Telcordia Technologies, Issue 1, Mar. 1996.
"SR-3065: LSSGR Guide," Telcordia Technologies, Issue 7, Aug. 2003.
www.carrollcommunications.com/ipoffice/5donotdisturb.html, p. 1 of 2 , Sep. 2007.
www.cisco.com/en/U/s/products/sw/voicesw/ps556/products_administration_guide, pp. 3-5 of 26, Copyright 2005.
Newton's Telecom Dictionary 22nd Edition, p. 829, Feb. 2006.
Sparks, "RFC 3515—The Session Initiation Protocol (SIP) Refer Method," The Internet Society, Apr. 2003.
Mahy et al., "RFC 3891—The Session Initiation Protocol (SIP) 'Replaces' Header," The Internet Society, Sep. 2004.
Mahy et al, "RFC 3911—The Session Initiation Protocol (SIP) 'Join' Header," The Internet Society, Oct. 2004.
Handley et al., "RFC 2327—SDP: Session Description Protocol," the Internet Society, Apr. 1998.
Schulzrinne et al., "RFC 1889—RTP: A Transport Protocol for Real-Time Applications," The Internet Society, Jan. 1996.
Mahy et al., "draft-ietf-sip-replaces-05—The Session Initiation Protocol (SIP) "Replaces" Header," The Internet Society, Feb. 16, 2004.

Schulzrinne, "draft-ietf-sipping-sos-00—Emergency Services URI for the Session Initiation Protocol," The Internet Society, Feb. 8, 2004.
Rosenberg et al., "draft-ietf-sipping-dialog-package-04—An INVITE Initiated Dialog Event Package for the Session Initiation Protocol (SIP)," The Internet Society, Feb. 13, 2004.
Lingle et al., "draft-ietf-sip-mib-08—Management Information Base for Session Initiation Protocol (SIP)," The Internet Society, Jul. 16, 2004.
Johnston et al., "draft-ietf-sipping-cc-conferencing-04—Session Initiation Protocol Call Control—Conferencing for User Agents," The Internet Society, Jul. 18, 2004.
Sparks et al., "draft-ietf-sipping-cc-transfer-02—Session Initiation Protocol Call Control—Transfer," The Internet Society, Feb. 15, 2004.
Rosenberg et al., "draft-ietf-sipping-conference-package-04—A Session Initiation Protocol (SIP) Event Package for Conference State," The Internet Society, May 21, 2004.
Petrie, "draft-ietf-sipping-config-framework-04—A Framework for Session Initiation Protocol User Agent Profile Delivery," The Internet Society, Jul. 21, 2004.
"GR-1298-CORE—AINGR: Switching Systems," Telcordia Technologies, Issue 6, Nov. 2000.

* cited by examiner

500

| Received Announcement Information (502) | Processed Announcement Information (504) |
|---|---|
| Single Frequency Pattern P1 | P1p |
| Multi-tonal Pattern Pm | P2p |
| Audio file / Video File | P3p |
| Vibration Pattern P4 | P4p |
| Light Emission Pattern P5 | P5p |
| None/default/Unrecognized | P6p |

600

| Pattern Number 602 | URI 604 | Power Ringing Pattern (repeated unless otherwise noted) 606 | Call Waiting Alert Pattern (440 Hz) 608 |
|---|---|---|---|
| 1 | http://127.0.0.1/ standardring | 2s on, 4 s off | 0.3s on, 0.3s off |
| 2 | http://127.0.0.1/ring1 | 0.8s on, 0.4s off, 0.8s on, 4s off | 0.1s on, 0.1s off, 0.1s on |
| 3 | http://127.0.0.1/ring2 | 0.4s on, 0.2s off, 0.4s on, 0.2s off, 0.8s on, 4s off | 0.1s on, 0.1s off 0.1s on, 0.1s off 0.1s on |
| 4 | http://127.0.0.1/ring3 | 0.3s on, 0.2s off, 1s on, 0.2s off, 0.3s on, 4s off | 0.1s on, 0.1s off, 0.3s on, 0.1s off 0.1s on |
| 5 | http://127.0.0.1/ring4 | 0.50s on (not repeated) | (not applicable) |
| 6 | http://127.0.0.1/ring5 | 1.5s on, 4.5s off | none |
| 7 | http://127.0.0.1/ring6 | 1.5s on, 0.5s off, 1.5s on, 2.5s off | none |
| 8 | http://127.0.0.1/ring7 | 1.5s on, 0.5s off, 0.5s on, 3.5s off | none |
| 9 | http://127.0.0.1/ring8 | 1.5s on, 0.5s off, 0.5s on 0.5 s off, 0.5 s on, 2.5 s off | none |
| 10 | http://127.0.0.1/ring9 | 1.5s on, 0.5s off, 0.5s off, 1.0s on, 2.0s off | none |
| 11 | http://127.0.0.1/ring10 | 0.5s on, 0.5s off, 0.5s on, 0.5s off, 0.5s on, 0.5s off 0.5s on, 2.5s off | none |

Figure 6

METHOD AND SYSTEM FOR PROVIDING DISTINCTIVE ANNOUNCEMENTS IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a packet-switched and/or packet-based network such as a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

FIG. 6 illustrates an exemplary processing table for mapping announcement information to an alerting pattern, according to an embodiment of the present invention.

DETAILED DESCRIPTION OF PREFERRED EMBODIMENTS

A system and process of an exemplary embodiment of the present invention provides receiving a connection request including announcement information, the announcement information being associated with a distinctive announcement, and establishing a data session over a data network with a remote communication device based on the connection request. The system and method may further provide mapping the announcement information to an alerting pattern, and generating an alerting signal for producing the alerting pattern.

A module as used herein may refer to hardware, software, firmware, and/or combinations thereof.

Figure 1:
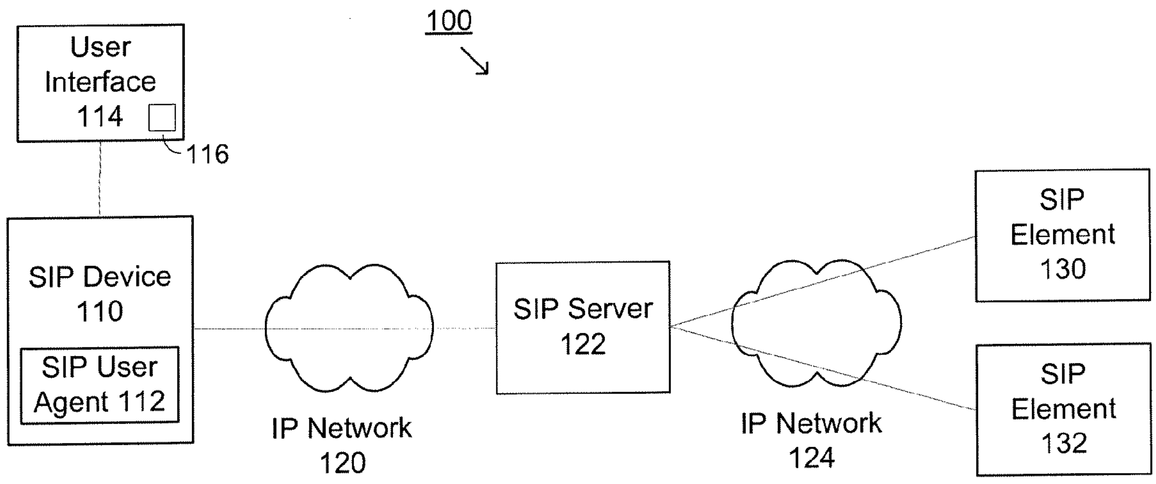
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular, for generating a distinctive announcement, such as distinctive ringing, to inform a user about an established data session. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voiceband or other signaling, including but not limited to data modems, facsimile devices, teletype (TTY) equipment, etc. User Interface 114 also may include an announcement device 116 for providing a distinctive announcement. The announcement device 116 may include a sound generator device (e.g., a speaker), a ring generator, a light-emitting device (e.g., a light emitting diode, a light bulb, etc.), a vibrating unit, a display screen for visually displaying a message or video, other announcement devices, and/or combinations thereof.

SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

Figure 2:
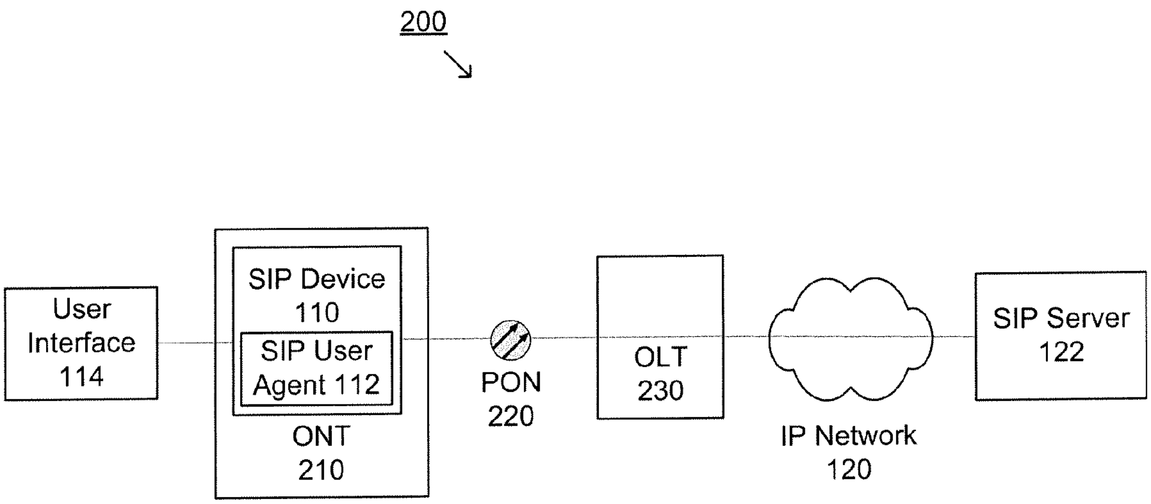
FIG. 2 illustrates an exemplary implementation where a SIP Device is used in connection with a FTTP network, according to an embodiment of the present invention.
Figure 3:
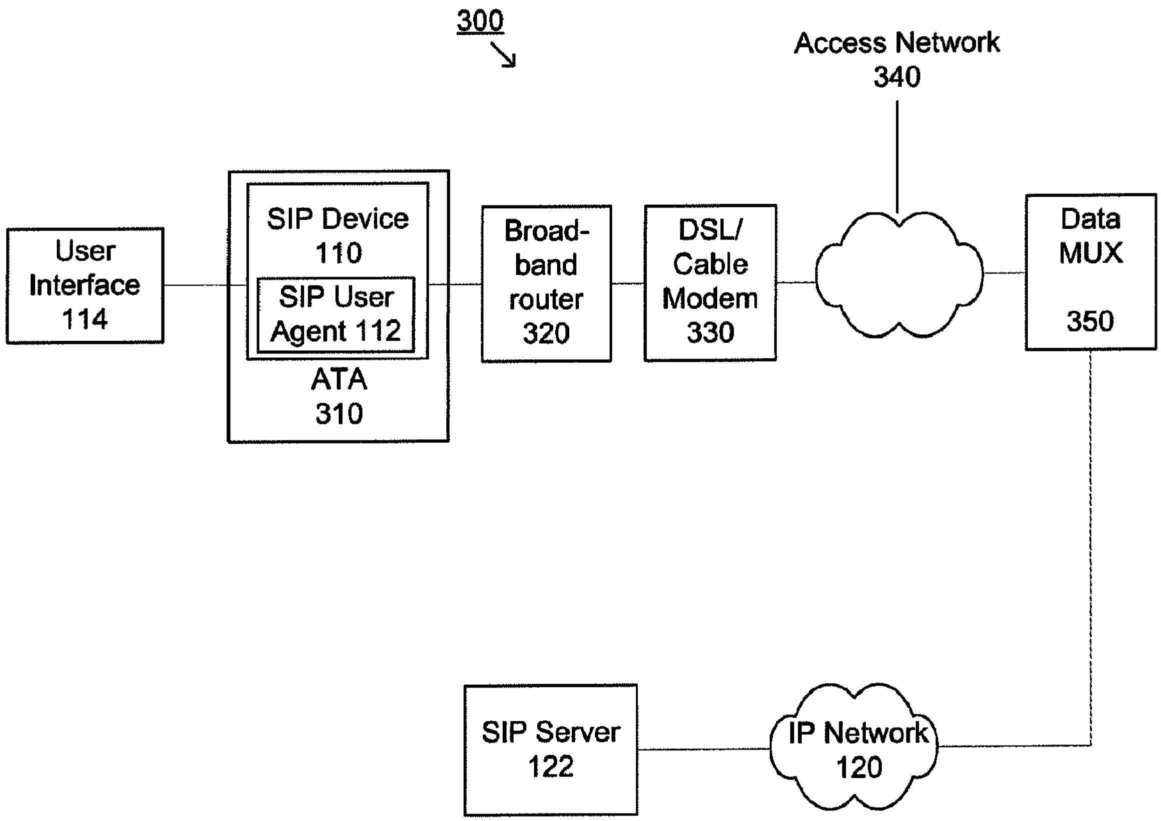
FIG. 3 illustrates an exemplary implementation where a SIP Device is embedded in an ATA device connected to an IP Network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

One calling service available in telephony networks, such as PSTN, is distinctive ringing that may inform a called party about an available call. Distinctive ringing also permits a called party to identify particular information associated with the call. In SIP INVITE messages, the SIP standard describes including a uniform resource identifier (URI) in an Alert-Info field. The URI may identify a server for obtaining audio information that provides multi-tonal distinctive ringing at the device. Conventional analog phone interfaces, however, often do not support multi-tonal audio. Exemplary embodiments of the present invention overcome these and other problems.

During establishment, communication, and termination of data sessions over the IP Networks 120 and 124, the SIP Device 110 may be a gateway device for communicating with the User Interface 114 and with the SIP Server 122. Data sessions may be SIP dialogs, for example. When also communicating with the SIP Device 130, for example, the SIP Device 110 may receive analog signals from the User Interface 114, convert the analog signals to a form suitable for transport over the IP Networks 120 and 124 (e.g., digital data, such as IP packets, etc.), and may convert digital data received from the IP Networks 120 and 124 to analog signals useable by the User Interface 114. For example, the SIP User Agent 112 may be a component in a Voice over W (VoIP) system.

Figures 4, 5:
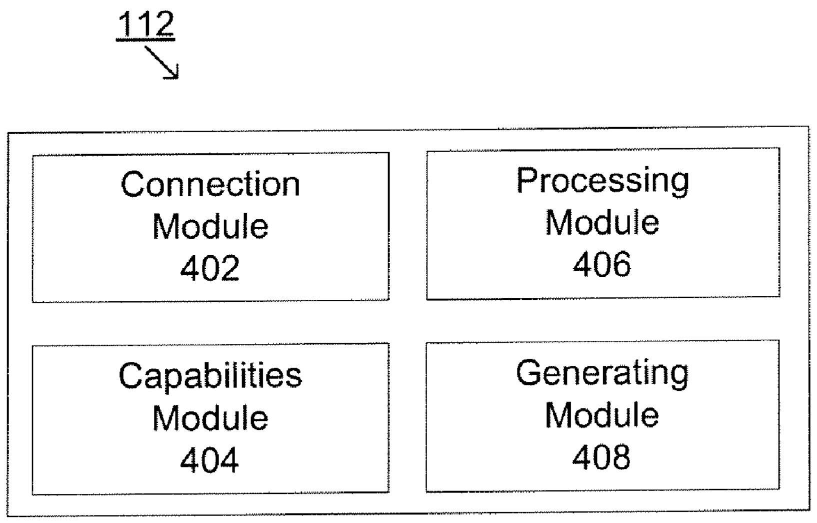
FIG. 4 illustrates an exemplary embodiment of various modules included in a SIP User Agent, according to an embodiment of the present invention.
FIG. 5 illustrates an exemplary processing table, according to an embodiment of the present invention.

FIG. 4 illustrates various modules included in the SIP User Agent 112 for receiving and processing connection requests received from the SIP Server 122. In an exemplary embodiment, the SIP User Agent 112 may include a connection module 402, a capabilities module 404, a processing module 406, and a generating module 408. It is noted that the modules 402-408 are exemplary. Other modules may be included in the SIP User Agent 112. In addition, the modules 402-408 may be combined, integrated, and/or duplicated to support various applications. Further, the modules 402-408 may be implemented across multiple User Agents and/or other components.

The capabilities module 404 may generate capabilities information based on the capabilities of the announcement device 116 of the User Interface 114. The capabilities information may identify what sounds, frequencies, amplitudes, light patterns, vibration patterns, text, audio, video, etc., may be produced by the announcement device 116. The capabilities information also may identify whether the User Interface 114 may receive in-session alerting signals or out-of-session alerting signals. The User Interface 114 may receive in-session alerting signals when receiving analog signals, such as, but not limited to, telephony signals, from the SIP Device 110 from a previously established data session, and may receive the out-of-session alerting signals when a previous data session has not been established. For example, the out-of-session alerting signals may be used when a telephone receiver of the User Interface 114 is "on-hook," and the in-session alerting signals may be used when a telephone receiver is "off-hook." In-session alerting signals may include voice-band signals, for example. In an exemplary VoIP embodiment, the in-session alerting signals may be a call waiting alerting signal to inform the user about a new call.

The User Interface 114 may receive out-of-session alerting signals when not receiving analog signals from the SIP Device 110 from a previously established data session. For example, receiving the out-of-session alerting signals may cause the announcement device 116 to generate: a tone at a single amplitude and at a single frequency, a tone at multiple frequencies and at a single amplitude, a tone at multiple frequencies and at multiple amplitudes, music, a vibration, a visual message, light emitted continuously or in a pattern, video, audio, text, ringing (e.g., from a metal bell), etc., and/or combinations thereof.

To determine the capabilities information, the capabilities module 404 may instruct the generating module 408 to generate various analog signals for interacting with the announcement device 116 of the User Interface 114. Based on a response and/or lack of response received from the User Interface 114, the capabilities module 404 may generate capabilities information identifying the capabilities of the announcement device 116. Additionally, the capabilities module 404 may indicate in the capabilities information whether the connection module 402 is involved with another data session when the connection request is received.

For example, the capabilities module 404 may instruct the generating module 404 to produce one or more analog signals for interacting with the User Interface 114. Receiving the analog signals may or may not cause the User Interface 114 generate a response analog signal, depending on the capabilities of the User Interface 114. If the capabilities module 404 does not receive a response signal, the capabilities module 404 may indicate that the announcement device 116 of the User Interface 114 may generate a tone at a single amplitude and at a single frequency (e.g., conventional power ringing). Also, as a default, the capabilities module 404 may indicate that the announcement device 116 of the User Interface 114 may generate a tone at a single amplitude and at a single frequency as a default without producing any analog signals for interacting with the User Interface 114.

In a second example, receiving the analog signal from the SIP Device 110 may cause the User Interface 114 to respond with an analog signal representing a response code. For example, receiving the analog signal may activate a transmitter of the User Interface 114 that transmits a sequence of one or more coded signals. The coded signal may be Dual Tone Multi-Frequency (DTMF) signals or pulse dialing signals, for example. The coded signal may correspond to one or more capabilities of the announcement device 116. For example, the sequence 101 may indicate that the announcement device 116 may generate multi-tonal audio (e.g., the first "1" of the sequence 101), may not vibrate (e.g., the 0 of the sequence 101), and may emit light (e.g., the second "1" of the sequence 101). The sequence also may be transmitted as the DTMF signal for the digit 5, which represents the sequence 101 in binary. Coded signals may be used to represent other capabilities, such as the ability to play music, video, display text, emit light, etc. Also, a user of the User Interface 114 may manually input the response code by pressing a digit on a telephone keypad, for example. Once the response code is received, the capabilities module 404 may include the corresponding capabilities in the capabilities information.

After determining the capabilities information, the connection module 402 may process connection requests received from the SIP Server 122 and may use the connection requests to establish a data session. For example, the SIP Element 130 may send a connection request to the SIP Server 122 to establish a data session between the SIP Device 110 and the SIP Element 130 to exchange VoIP packets over the IP Networks 120 and 124 with the User Interface 114. Once a connection request is received, the connection module 402 may interact with the SIP Server 122 and the requesting device (e.g., SIP Element 130) to establish a data session with the requesting device.

The connection request may contain announcement information useable by the announcement device 116 to generate a distinctive announcement to inform the user of the User Interface 114 about the established data session. In an exemplary embodiment, the SIP Element 130 may identify a distinctive announcement for uniquely alerting the user of the User Interface 114 about the established data session. The distinctive announcement may be a ringing pattern, a light emission pattern, a vibration pattern, an audio message, a text message, a video message, a recorded voice announcement from the calling party, etc., combinations thereof, and/or other manners for a person or device to uniquely announce the established data session.

The distinctive announcement may provide the user of the User Interface 114 with information about the calling party, the called party, or other types of information about the data session. For example, the distinctive announcement may indicate that the data session is a long distance VoIP call, an emergency call (e.g., a family emergency), a call for a particular caller (e.g., group of callers each having a unique ringing pattern), a call from a particular caller (e.g., family members each may be assigned a unique ringing pattern), a call from a caller who has blocked sending caller ID information, etc.

The SIP Element 130 may forward the announcement information in a connection request to the SIP Server 122, and the SIP Server 122 may include the announcement information in a connection request to the SIP User Agent 112. For example, the SIP Server 122 may include in the announcement information a value corresponding to the distinctive announcement in an Alert-info field of a SIP INVITE message. The value may be a Uniform Resource Identifier (URI). The value also may be a number useable to identify one of several distinctive announcements. The value may be used to instruct the SIP User Agent 112 to generate a particular alerting signal useable by the announcement device 116 to alert the user about the established data session. Receiving the alerting signal may cause the announcement device 116 to generate a continuous tone, a pattern of tones at a single frequency, a tone at multiple frequencies, a pattern of tones at multiple frequencies, music, other audible signals, a vibration, a text message, music, video, a light pattern, a call waiting signal, etc., and/or combinations thereof.

The announcement information also may identify standard alerting patterns, such as, but not limited to, the power ringing and standard alerting patterns identified in "Signaling for Analog Interfaces," GR-506-CORE, Telecordia Technologies, Issue 1, June 1996, the contents of which is incorporated herein by reference in its entirety. The announcement information also may be associated with other standards, and may be specified by the user of the User Interface 114, a user of the SIP Elements 130 or 132, the SIP Server 122, a telecommunications provider, a government entity, etc., other devices communicatively coupled to the IP Networks 120 and 124, and/or combinations thereof.

Before generating the alerting signal, the connection module 402 may forward the connection request to the processing module 406 for processing. The processing module 406 may process the connection request to determine whether the announcement device 116 of the User Interface 114 may properly generate a distinctive announcement as indicated in the announcement information. The processing module 406 may generate processed announcement information upon determining whether to modify the announcement information based on capabilities information of the announcement device 116.

If the capabilities information indicates that the announcement device 116 may generate the type of distinctive announcement identified by the announcement information, the processing module 406 may not modify the announcement information. Thus, the processed announcement information may identify the same distinctive announcement as identified in the announcement information of the connection request. If the capabilities information indicates that the announcement device 116 may not generate the distinctive announcement identified in the announcement information, the processing module 406 may modify the announcement information by replacing the announcement information with a different announcement information that may be produced by the announcement device 116 or by mapping the announcement information to an alerting pattern that may differ from the announcement information.

For example, if the capabilities information indicates that the announcement device 116 of the User Interface 114 may produce a single frequency audio tone at a single amplitude, and if the announcement information identifies a multi-frequency multi-tonal pattern at various amplitudes, then the processing module 406 may replace the announcement information with new announcement information that may identify an alerting pattern of a single frequency audio tone at a single amplitude. In a second example, if the capabilities information indicates that the User Interface 114 may produce a multi-frequency multi-tonal pattern and if the announcement information identifies a multi-frequency multi-tonal pattern, then the processing module 406 may not modify the announcement information since the capabilities information indicates that the announcement device 116 may generate the identified multi-frequency multi-tonal pattern. In a third example, if the capabilities information indicates that the User Interface 114 may produce a single frequency audio tone at a single amplitude and if the announcement information identifies a vibration pattern, then the processing module 406 may replace the announcement information with a new announcement information identifying an alerting pattern of a single frequency audio tone at a single amplitude. Other permutations and modifications also may be made to the announcement information based on the capabilities information.

FIG. 5 illustrates an exemplary embodiment of a processing table 500 depicting relationships between the received announcement information and the processed announcement information. The processing table 500 may illustrate what modification occurs, if any, to the announcement information included in the connection request during processing by the processing module 406. In an exemplary embodiment, the processing table 500 may include two columns, where a first column 502 may include the announcement information included in the connection request as identified by the processing module 406, and a second column 504 may include the processed announcement information as generated by the processing module 406 after processing the received announcement information based on the capabilities information.

The first column 502 may represent various types of announcement information identified in the connection request by the processing module 406. In an exemplary embodiment, the announcement information may identify location for retrieving a data file of: audio (e.g., music, calling party's recorded voice announcement, etc.); a ringing pattern (e.g., long short long, long long short, etc.); text; video; a vibrational pattern; a light-emission pattern; etc.; other patterns; and/or combinations thereof. For example, the announcement information may include a uniform resource identifier (URI) identifying the SIP Server 122 and the data file. The URI also may identify other servers (not shown) over the IP Network 120 and/or the IP Network 124. Additionally, the announcement information may indicate that the data file for generating the distinctive announcement is included in the connection request or that the announcement information includes the distinctive announcement, and may not require accessing a server. Also, the SIP Device 110 may store data files for generating distinctive announcements based on standardized or previously obtained distinctive announcements.

In the exemplary embodiment depicted in FIG. 5, the announcement information in the first column 502 may identify a data file of: a single frequency pattern of tones P1; a multi-tonal pattern of tones Pm; an audio file/video file; a vibration pattern P4; a light emission pattern P5; and a none/default/unrecognized file. The processing module 406 may determine that the announcement information is none/default/unrecognized file if unable to identify a distinctive announcement identified in the announcement information, if the connection request does not include announcement information, or if the announcement information may not be placed in any other category. The announcement information also may identify or include other types of patterns not specified in FIG. 5.

The second column 504 may include processed announcement information, as represented by P1*p*-P6*p*. The processing module 406 may generate the processed announcement information based on the capabilities information. The processed announcement information may be used to instruct the generating module 408 to generate an alerting signal. The processed announcement information also may specify whether the alerting signal is an in-session alerting signal or an out-of-session alerting signal. The processed announcement information may identify the same distinctive announcement as identified in the announcement information, or may be a modification to the announcement information if the announcement device 116 is unable to generate the identified distinctive announcement or if a previous data session has been established.

In an exemplary embodiment, if the capabilities information indicates that the announcement device 116 may produce an audible sound at a single frequency and at a single amplitude, and may not produce any vibrations, multi-tonal sounds, or light patterns, the processing module 406 may modify any announcement information that does not identify an audible sound at a single frequency and at a single amplitude. When the announcement information identifies a non-single frequency distinctive announcement, such as music or multi-frequency patterns, the processing module 406 may modify the announcement information.

Even if the announcement device 116 may produce the distinctive announcement, the processing module 406 may modify the announcement information. For example, the processing module 406 may modify the announcement information when the connection module 402 indicates that a previous data session has been established. Thus, the processing module 406 may generate processed announcement information that may use a standard in-session alerting signal, such as, but not limited to, a call waiting alert, when a previous data session has been established. Also, when a previous data session has been established, the processing module 406 may not modify the announcement information. For example, the processing module 406 may instruct the generating module 408 to include an in-session alerting signal based on the distinctive announcement in addition to analog signals associated with the previous data session. The in-session alerting signal may be based on an audio file (or other data files) and may be include a repeating voice message from the calling party that is added to analog signals associated with the previous data session sent from the SIP Device 110 to the User Interface 114, for example. Thus, a user may hear a spoken message as an in-session alerting signal from a second caller when talking with a first caller, for example. In-session alerting also may cause the User Interface 114 to vibrate, emit a lighting pattern, produce a ringing pattern, display a text message, etc.

An exemplary embodiment of processing announcement information based on capabilities information indicating that the announcement device 116 may produce a single frequency audible tone at a single amplitude may be discussed with relation to FIG. 5. For example, the processing module 406 may not modify the announcement information identifying the single frequency pattern P1 during processing and may use the single frequency pattern P1 for generating the alerting signal (See processing table 500, FIG. 5). The single frequency pattern P1 may be associated with a call from a particular caller, a long distance call, a call for a particular person, etc. Thus, the pattern P1 identified in the announcement information may be the same as the pattern P1*p* identified in the processed announcement information (See FIG. 5). Hence, the processing module 406 may not modify the announcement information if the distinctive announcement may be produced at the announcement device 116.

FIG. 5 also depicts announcement information identifying a multi-tonal pattern Pm. The processing module 406 may replace the announcement information identifying the multi-tonal pattern Pm with the a single frequency pattern P2 in the processed announcement information based on the capabilities information. The multi-tonal pattern Pm may represent a call from a particular caller, a long distance call, a call for a particular person, etc., and the single frequency pattern P2 may be a single frequency tone pattern corresponding to a particular caller, a long distance call, a call for a particular person, etc. Hence, the single frequency pattern p2 may represent the same information (e.g., call from a particular caller, etc.) as the multi-tonal pattern Pm using a single tone frequency. The processing module 406 may instruct the generating module 408 to generate an alerting signal based on the pattern P2, which may be stored locally at the SIP User Agent 112, or may be obtained from a server. The processing module 406 may similarly modify announcement information identifying an audio file, a video file, a light emission pattern, a vibration pattern, a text message, etc.

If the connection request does not include announcement information, if the announcement information does not fall within a recognized category in the processing table 500, or if the processing module 406 does not recognize the distinctive announcement identified by the announcement information, the processing module 406 may use the announcement information identifying pattern P6*p* as a default, for example. Additionally, it is noted that the processing table 500 is exemplary. Other entries in the columns and rows may be used, and the processing table 500 may include any desired number of columns and rows. The principles described in FIG. 5 also may be applied to situations where the User Interface 114 may be capable of generating multi-tonal, music, vibrations, light, video, text, audio, etc.

After the processing module 406 generates the processed announcement information, the generating module 408 may generate an alerting signal for the User Interface 114 based on the processed announcement information. In an exemplary embodiment, when a previous data session has not been established, the out-of-session alerting signal may include an analog signal useable by the announcement device 116 to generate an audible sound, to generate a visual message, to emit light continuously or in a pattern, to vibrate the User Interface 114, to generate music, to generate video, and/or combinations thereof. When a previous data session has been established, the in-session alerting signal may be a call alerting signal, for example. The in-session alerting signal also may include music, a recorded message, a light pattern, a vibration, etc.

In an exemplary embodiment, the alerting signal may be a repeating pattern of a constant voltage in a first time interval followed by a zero voltage in a second time interval. When no other data session has been established, this alerting signal may cause the announcement device 116 of the User Interface 114 to alternately generate an audible sound during the constant voltage time interval followed by no sound during the zero voltage time interval. When another data session has been established, this alerting signal may cause the User Interface 114 to alternately generate an audible sound in a receiver of the User Interface 114 during the constant voltage time interval followed by no sound during the zero voltage time interval, for example. For example, the in-session alerting signal may be a call waiting alert playable at a speaker in a telephone receiver of the User Interface 114 to alert the user about another call. Other alerting signals may be generated and audible and/or visual alerts may be generated at devices other than the announcement device 116 or the telephone receiver.

FIG. 6 illustrates an exemplary processing table 600 for mapping announcement information identifying a distinctive announcement to an alerting pattern that may be the same as or may differ from the distinctive announcement, according to an exemplary embodiment of the present invention. The processing table 600 may associate announcement information received either as a URI or a pattern number with an out-of-session alerting signal or an in-session alerting signal. The processing table 600 may include a pattern number column 602, a URI column 604, a power ringing pattern column 606, and a call waiting alert pattern column 608. The announcement information may include data corresponding to an entry in either the pattern number column 602, the URI column 604, or both. The pattern number column 602 may identify a distinctive announcement, which may be stored locally at the SIP Device 110. If the SIP Device 110 does not have a stored copy of the distinctive announcement, the SIP Device 110 may use a URI in the URI column 604 to obtain the distinctive announcement from a server, for example. For the entry corresponding to pattern number 1 in the pattern number column 602, the corresponding URI may be http://127.0.0.1/standardring. Pattern number 1 may represent a standard ring of a single frequency tone at a single amplitude. Pattern numbers 2-11 in FIG. 6 may represent multi-tonal frequency patterns, splash rings, or other known ring tones.

For out-of-session alerting, as identified in the power ringing pattern column 606, the alerting pattern corresponding to pattern number 1 may ring for 2 seconds (s), and may not send any signal for causing a ring in the following 2 s. Thereafter, the out-of-session alerting pattern based on pattern number 1 may repeat. For in-session alerting, as identified in the call waiting alerting pattern column 608, alerting pattern corresponding to the pattern number 1 may provide a call waiting alert for 0.3 s, and may not send any signal for causing a call waiting alert in the following 0.3 s. The call waiting alert may be an analog signal for generating a 440 hertz (Hz) tone at a receiver of a telephone at the User Interface 114, for example. Thereafter, the in-session alerting based on pattern number 1 may repeat. The remaining columns of the processing table 600 for pattern numbers 2-11 include similar data.

It is noted that processing table 600 is exemplary, and may be modified or altered to include other types of information, such as other types of URIs, power ringing patterns, call waiting alerts, and pattern numbers. Also, the processing table 600 may override the announcement information and may map the announcement information to an alerting pattern based on a caller identification, a called party, a long distance call, etc.

Figure 7:
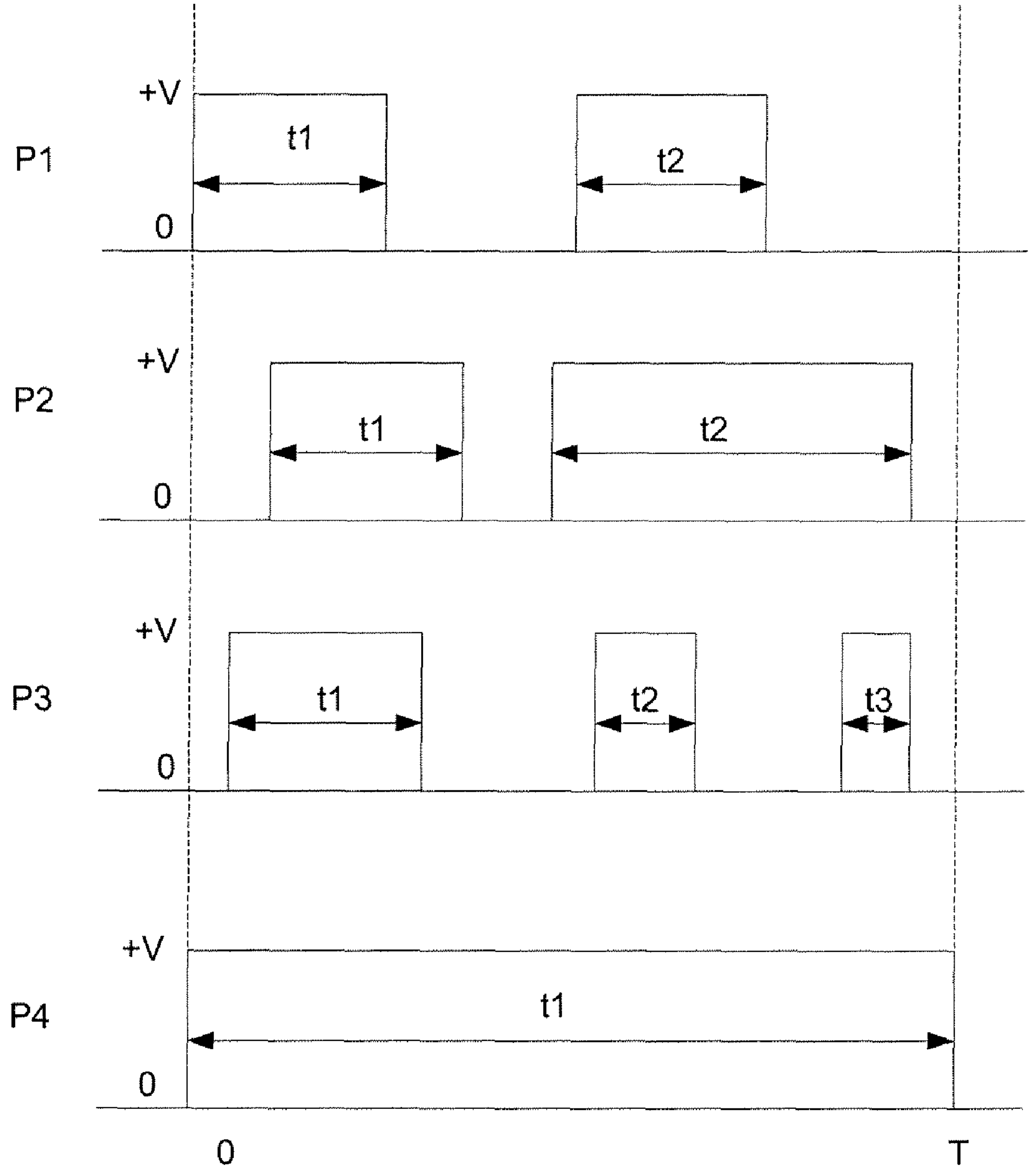
FIG. 7 illustrates various exemplary patterns of alerting signals generated by a generating module, according to an embodiment of the present invention.

FIG. 7 illustrates various exemplary patterns P1-P4 representing alerting signals generated by the generating module 408 based on patterns identified or included in the announcement information. Over a period of time T, the patterns P1-P4 may switch between zero volts and +V volts. In P1, the generating module 408 may generate an alerting signal having a voltage of +V volts in time intervals t1 and t2 and may not generate a voltage for the remainder of the period T. In this example, time interval t1 may be the same length as time interval t2. In P2, time interval t1 is smaller than time interval t2. In P3, the generating module 408 may generate an alerting signal having a voltage of +V volts in time intervals t1, t2, and t3, and may not generate a positive voltage for the remainder of the period T. Time intervals t1, t2, and t3 in P3 all may be different lengths of time. In P4, time interval t1 may occur during the whole time period T, and hence the announcement device 116 may produce a constant ring, for example. The announcement device 116 of the User Interface 114 may receive and may generate an audible tone based on patterns P1-P4. Patterns P1-P4 also may include varying voltages and varying frequencies, which are omitted for brevity. Other patterns also may be used. Additionally, the patterns P1-P4 may represent other types of analog signals, such as voice signals, audio, video, text, etc.

Figure 8:
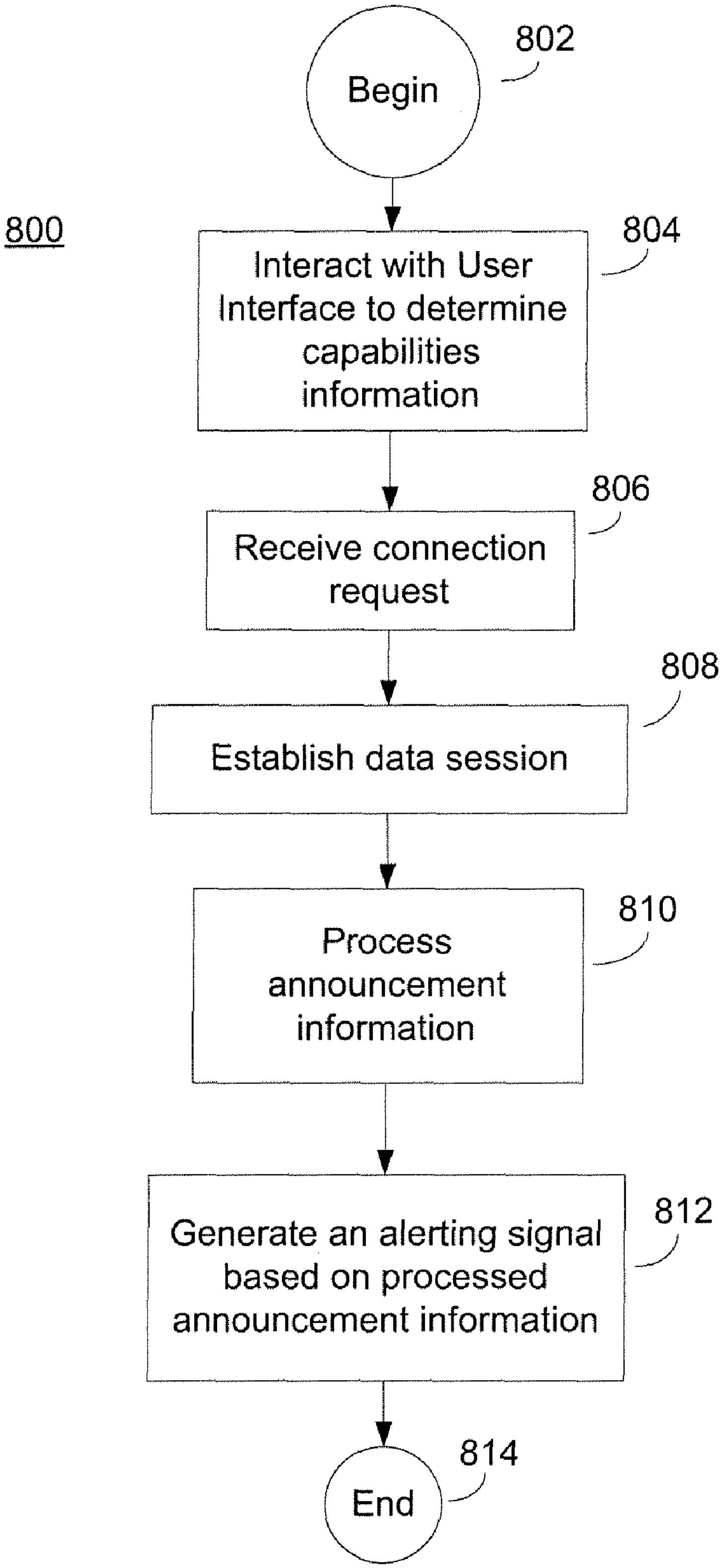
FIG. 8 is an exemplary flow diagram of processing performed at a SIP User Agent to generate an alerting signal for a User Interface, according to an embodiment of the present invention.

FIG. 8 illustrates an exemplary flow diagram illustrating operations performed at the SIP User Agent 112 to process a connection request for establishing a data session and for generating an alerting signal. The flow diagram 800 may begin at 802 and may continue to 804.

In 804, the capabilities module 404 may interact with the User Interface 114 to determine capabilities information identifying the capabilities of the announcement device 116 of the User Interface 114. Also, the capabilities module 404 may not interact with the User Interface 114 and may set the capabilities information as a default. The default capabilities information may indicate that the announcement device 116 may produce a single tone frequency at a single amplitude, which may be standard on conventional telephones.

In 806, the connection module 402 may receive a connection request including announcement information. The connection module 402 also may identify whether the connection module 402 has established a previous data session. For example, the connection module 402 may determine that a previous data session has been established with SIP Element 132 and that the connection request is from SIP Element 130. The connection module 402 may forward indication information to the capabilities module 404 indicating whether the connection module 402 has established a previous data session for updating the capabilities information. The indication information also may be separate from the capabilities information.

In 808, the connection module 402 may establish a data session based on the connection request. For example, the connection module 402 may communicate with the SIP Server 122 and/or the requesting device (e.g., SIP Element 130) to establish a data session with the requesting device. The connection module 402 also may indicate if a data session may not be established based on the connection request. For example, the connection module 402 may transmit a failure message to the SIP Server 122 and/or the SIP Element 130 if unable to establish a data session with the SIP Element 130, for example.

In 810, the processing module 406 may process the connection request to generate processed announcement information. The processed announcement information may identify or include the same announcement information as the announcement information, or may be a modification of the announcement information based on the capabilities information. The processing module 406 may obtain a data file from the SIP Server 122 identified in the announcement information, a data file stored locally at the SIP Device 110 identified in the announcement information, or may obtain a data file included in the announcement information.

In 812, the generating module 408 may generate an alerting signal based on the processed announcement information. The alerting signal may be an in-session alerting signal or an out-of-session alerting signal. The generating module 408 may then transmit the alerting signal to the announcement device 116 of the User Interface 114 for generating the distinctive announcement, which may be an audible sound, a visual indicator (e.g., light or a message), a vibration, a call waiting alerting signal, etc., and/or combinations thereof, for example. The flow diagram 800 may continue to 814 and end.

Figure 9:
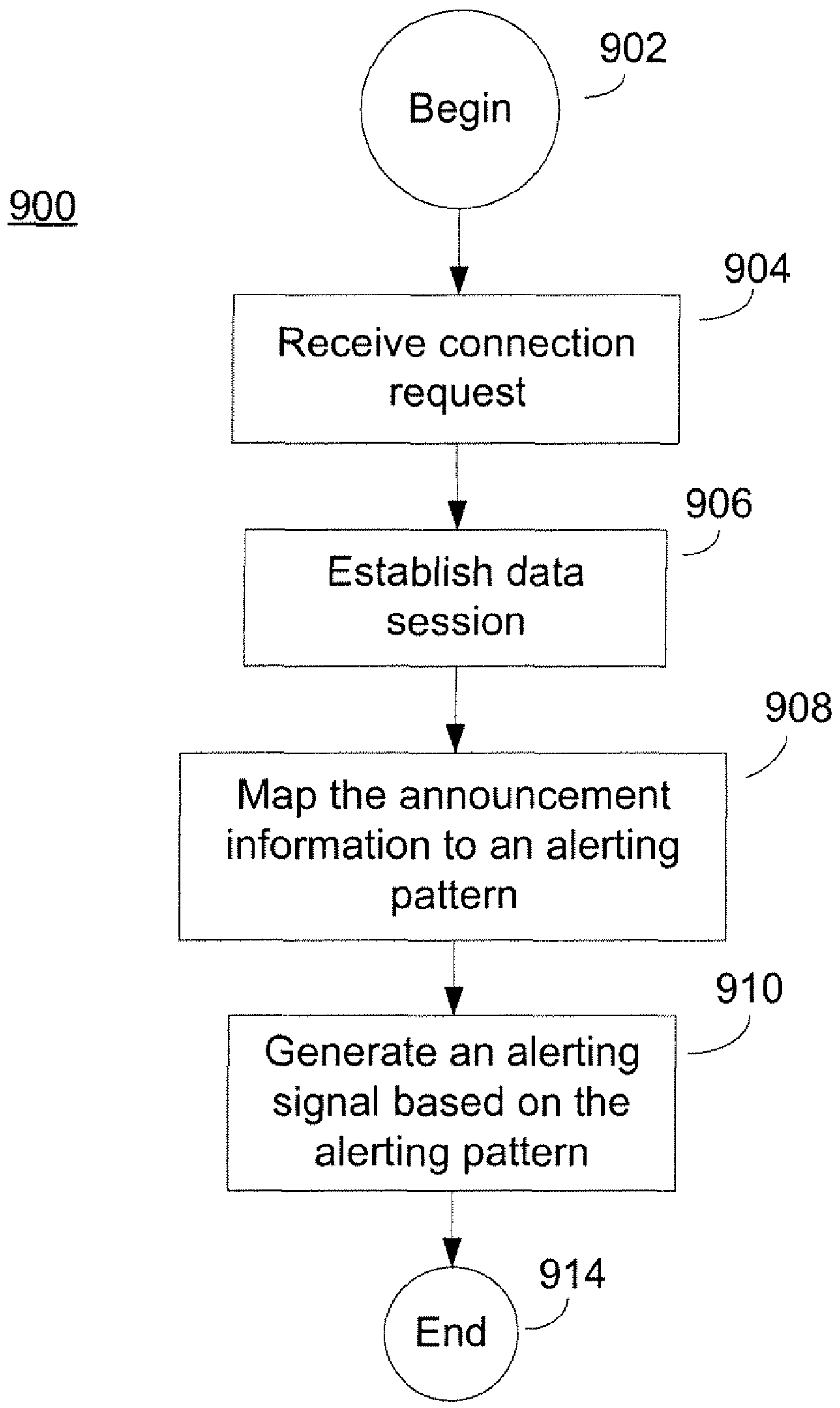
FIG. 9 is an exemplary flow diagram of mapping announcement information to an alerting pattern, according to an embodiment of the present invention.

FIG. 9 illustrates an exemplary flow diagram for mapping announcement information received in a connection request to an alerting pattern, according to an exemplary embodiment of the present invention. The flow diagram 900 may begin at 902 and may continue to 904.

In 904, the connection module 402 may receive a connection request including announcement information. The announcement information may be associated with a distinctive announcement, such as a data file of audio, video, text, etc., a vibration pattern, a light emission pattern, a multi-tonal ringing pattern, and/or combinations thereof.

In 906, the connection module 402 may establish a data session based on the connection request over the IP Networks 120 and 124 with the SIP Element 130, for example.

In 908, the processing module 406 may map the announcement information to an alerting pattern, which may differ from the distinctive announcement. For example, the announcement information may include a URI from URI column 602, and the processing module 406 may map the announcement information to the corresponding alerting pattern. The distinctive announcement identified by the announcement information may be a data file of music, and the alerting pattern may correspond to a ringing pattern for generating a single tone frequency during particular time intervals at the User Interface 114, for example. The processing module 406 also may query the connection module 402 to determine whether a previous data session has been established.

In 910, the processing module 406 may instruct the generating module 408 to generate an alerting signal based on the alerting pattern. The alerting signal may be an in-session alerting signal or an out-of-session alerting signal based on whether a previous data session has been established. The generating module 408 may then transmit the alerting signal to the announcement device 116 of the User Interface 114 for generating the alerting pattern, which may be a ringing pattern that may cause a ringer of a telephone to ring during intervals specified in columns 606 or 608 of FIG. 6, for example. The flow diagram 900 may continue to 914 and end.

As described above, the SIP User Agent may receive announcement information included in a connection request, and may process the announcement information to provide an alerting signal for a User Interface.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:

generating capabilities information that indicates one or more capabilities of an announcement device to output announcement information that comprises a distinctive announcement, wherein the announcement device is communicatively coupled to a remote communication device;

receiving a connection request comprising the announcement information, the announcement information being associated with the distinctive announcement;

establishing a data session over a data network with the remote communication device based on the connection request;

mapping the announcement information to an alerting pattern based on at least the generated capabilities information; and generating an alerting signal for producing the alerting pattern.

2. The method of claim 1, wherein the connection request comprises a SIP INVITE message having a Alert-info header field, and wherein the Alert-info header field comprises the announcement information.

3. The method of claim 1, wherein the announcement information comprises a uniform resource identifier (URI) or a pattern number.

4. The method of claim 1, wherein the announcement information identifies a location of a data file.

5. The method of claim 1, wherein the alerting signal comprises an in-session alerting signal.

6. The method of claim 5, wherein the in-session alerting signal comprises a call waiting alerting signal.

7. The method of claim 1, wherein the alerting signal comprises an out-of-session alerting signal.

8. The method of claim 1, wherein the alerting pattern identifies a ringing pattern.

9. The method of claim 1, further comprising determining that a previous data session has been established.

10. The method of claim 9, wherein the alerting signal comprises an in-session alerting signal.

11. The method of claim 1, further comprising determining that a previous data session has not been established.

12. The method of claim 11, wherein the alerting signal comprises an out-of-session alerting signal.

13. The method of claim 1, wherein the announcement information identifies a data file, a multi-tonal frequency pattern, a vibration pattern, or a light-emission pattern.

14. The method of claim 1, wherein the alerting pattern differs from the distinctive announcement.

15. A non-transitory computer readable media comprising code to perform the acts of the method of claim 1.

16. A system comprising:

a capabilities computing apparatus to generate capabilities information that indicates one or more capabilities of an announcement device to output announcement information that comprises a distinctive announcement, wherein the announcement device is communicatively coupled to a remote communication device;

a connection computing apparatus to receive a connection request including the announcement information and to establish a data session over a data network with the remote communication device based on the connection request, the announcement information being associated with the distinctive announcement;

a processing computing apparatus communicatively coupled to the connection module and configured to map the announcement information to an alerting pattern based on at least the generated capabilities information; and a generating computing apparatus communicatively coupled to the connection module and configured to generate an alerting signal based on the alerting pattern.

17. The system of claim 16, wherein the connection request comprises a SIP INVITE message having a Alert-info field, and wherein the Alert-info field comprises the announcement information.

18. The system of claim 16, wherein the announcement information comprises a uniform resource identifier (URI) or a pattern number.

19. The system of claim 16, wherein the announcement information identifies a multi-tonal frequency pattern, a vibration pattern, or a light-emission pattern.

20. The system of claim 16, wherein the alerting pattern differs from the distinctive announcement.

21. A system comprising:

a server; and a gateway device communicatively coupled to the server and to a communication device, the gateway device comprising:

a capabilities module to generate capabilities information that indicates one or more capabilities of an announcement device to output announcement information that comprises a distinctive announcement, wherein the announcement device is communicatively coupled to the communication device;

a connection module to receive a connection request including the announcement information and to establish a data session over a data network with the communication device based on the connection request, the announcement information being associated with the distinctive announcement;

a processing module communicatively coupled to the connection module and configured to map the announcement information to an alerting pattern based on at least the generated capabilities information; and a generating module communicatively coupled to the processing module and configured to generate an alerting signal based on the alerting pattern for the communication device.

* * * * *